United States Patent Office 3,637,615
Patented Jan. 25, 1972

3,637,615
PRESSURE-SENSITIVE ADHESIVE
Alfred M. Coffman, Avon Lake, Ohio, assignor to The
B. F. Goodrich Company, New York, N.Y.
No Drawing. Filed Sept. 19, 1969, Ser. No. 859,567
Int. Cl. C08f 15/40
U.S. Cl. 260—80.73
10 Claims

ABSTRACT OF THE DISCLOSURE

Pressure-sensitive adhesives having an excellent balance of adhesive and cohesive strength at elevated temperatures are provided by interpolymers of (1) a major proportion of an alkyl ester of acrylic acid wherein the alkyl group contains 4 to 8 carbon atoms, (2) lesser proportions of an N-alkyl-keto-acrylamide and (3) small amounts (a) of at least one of an N-alkylol amide of $\alpha,\beta$-olefinically unsaturated carboxylic acids having from 4 to 10 carbon atoms, an N-substituted alkoxyalkyl acrylamide or methacrylamide and (b) at least one of an $\alpha,\beta$-olefinically unsaturated carboxylic acid containing 3 to 6 carbon atoms and a monoolefinically unsaturated amide having at least one hydrogen on the amide nitrogen and olefinic unsaturation $\alpha,\beta$ the carbonyl group.

BACKGROUND OF THE INVENTION

The use of polymers of alkyl esters of acrylic acid as pressure-sensitive adhesives is well known. While such materials have been successfully used in pressure-sensitive adhesive application as in tape, improved materials having a better balance of tack and adhesive and cohesive strength is desired. More particularly desirable are pressure-sensitive adhesives having good static shear and peel adhesion at elevated temperatures in applications involving adhering one structural member or surface to another.

SUMMARY OF THE INVENTION

Pressure-sensitive adhesives having an improved balance of static shear and peel adhesion at elevated temperatures for structural applications are obtained by copolymerizing together (1) more than 50% of an alkyl ester of acrylic acid wherein the alkyl group contains 4 to 8 carbon atoms, (2) from 10 to 40% of an N-alkyl-keto-acrylamide and (3) 1 to 10% total, and at least about 0.5%, of at least one of (a) an N-alkylol amide of $\alpha,\beta$-olefinically unsaturated carboxylic acids having from 4 to 10 carbon atoms and an N-substituted alkoxyalkyl acrylamide or methacrylamide and (b) at least one of an $\alpha,\beta$-olefinically unsaturated carboxylic acid containing 3 to 6 carbon atoms and a monoolefinically unsaturated amide having at least one hydrogen on the amide nitrogen and the olefinic unsaturation $\alpha,\beta$ to the carbonyl group, all percentages being weight percent based on the total constituents.

DETAILED DESCRIPTION

The alkyl ester of acrylic acid wherein the alkyl group contains 4 to 8 carbon atoms includes for example, butyl acrylate, isobutyl acrylate, amyl acrylate, isoamyl acrylate, hexyl acrylate, heptyl acrylate, octyl acrylate, isooctyl acrylate, 2-ethylhexyl acrylate and the like, and the equivalent cyanoalkyl and alkoxyalkyl acrylates. Particularly useful polymers are prepared from n-butyl acrylate and 2-ethylhexyl acrylate. The amount of the alkyl ester of acrylic acid employed is more than 50% of the total of other monomers, as from about 55 to 85 weight percent of the total polymer.

The second essential component of the improved pressure-sensitive adhesive polymers of this invention is an N-alkyl-keto-acrylamide having the structural formula

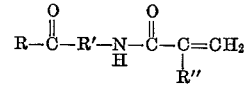

wherein R and R'' are hydrogen or lower alkyl radicals and R' is a lower alkyl-substituted ethylene radical containing 3 to 8 carbon atoms. Useful are those where R is an alkyl of 1 to 3 carbon atoms, R' is a dialkylene-substituted ethylene radical and R'' is H or CH$_3$, for example, diacetone acrylamide, N-(1,1-dimethyl-3-oxobutyl)-acrylamide or N[2-(methyl-4-oxopentyl)]-acrylamide. The amounts of these acrylamides used is from about 10 to 40 weight percent of the other monomers and in the polymer.

The N-alkylol amides of $\alpha,\beta$-olefinically unsaturated carboxylic acids used herein include those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type because of their ready availability and relative low cost are the N-alkylol amides of $\alpha,\beta$-monoolefinically unsaturated monocarboxylic acids and the most preferred are N-methylol acrylamide and N-methylol methacrylamide. The amount used will be from about 0.2 to about 3% of the copolymer.

The polymerizable N-alkoxyalkyl acrylamides utilized in minor proportions, i.e., 0.2 to about 3% by weight of the interpolymer, have the structure

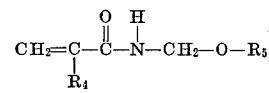

wherein R$_4$ is selected from the group consisting of hydrogen and methyl, and R$_5$ is an alkyl group having from 1 to 8 carbon atoms. It is thus tended that where references are made herein to N-substituted alkoxymethyl amides, the term "acrylamide" includes "methacrylamide" within its meaning. The preferred alkoxymethyl acrylamides are those wherein R$_5$ is an alkyl group containing from 2 to 5 carbon atoms and most preferred is N-butoxymethyl acrylamide.

The $\alpha,\beta$-olefinically unsaturated carboxylic acids useful in this invention are those having from 3 to 6 carbon atoms, representative members of which include acrylic acid, methacrylic acid, ethacrylic acid, mesaconic acid, citraconic acid, sorbic acid, maleic acid, crotonic acid and the like and anhydrides thereof. The preferred monomeric acids are the $\alpha,\beta$-monoolefinically unsaturated carboxylic acids. The most preferred are the $\alpha,\beta$-monoolefinically unsaturated monocarboxylic acids, particularly acrylic and methacrylic acids. The amount used is between about 1 to 10 percent of the copolymer.

The monoolefinically unsaturated amides which are incorporated in the interpolymers of this invention in minor proportions include acrylamide, methacrylamide, N-methyl acrylamide, N-t-butyl acrylamide, N-cyclohexyl acrylamide, N-ethyl acrylamide and others containing at least one hydrogen on the amide nitrogen. Preferred are amides having the structure

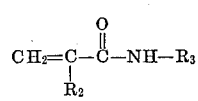

wherein R$_2$ is a member of the group consisting of hydrogen and an alkyl group having from 1 to 4 carbon atoms and $R_3$ is a member of the group consisting of hydrogen and an alkyl group having from 1 to 6 carbon atoms. Most preferred are acrylamide and methacrylamide. The amounts used will be from about 0.5 to 5% of the copolymer.

Very useful polymers are formed from the acrylic acid ester, the N-alkyl-keto-acrylamide, an N-alkoxyalkyl acrylamide and carboxylic acid. Such compositions have an excellent balance of adhesion-cohesion, particularly good static shear and peel adhesion for use in adhering surfaces of structural members together.

The monomeric mixture polymerized to give the rubbery compositions of this invention may contain a minor amount, usually less than about 20 percent of one or more other monoolefinically unsaturated monomers copolymerizable with the aforementioned acrylic acid or methacrylic acid ester. Suitable monoolefinically unsaturated monomers contain one $CH_2{=}C{<}$ grouping or one $—CH{=}CH—$ grouping. Representative compounds of this type are the vinyl cyanides such as acrylonitrile, methacrylonitrile, vinylidene cyanide, alkyl methacrylates such as methyl methacrylate and butyl methacrylate, α-cyanomethyl acrylate having the structure sentially complete. This provided solutions containing about 50% copolymer. A portion of the polymer was isolated from solution and dried and the Williams plasticity determined. The samples were also tested for peel adhesion and static shear as described. The table sets forth the proportions of monomers, the Williams plasticity and peel strength in pounds/inch.

In these examples, Williams plasticity measured in a Williams parallel plate plastometer adapted from the ASTM method (158° F.) for rubber, run at 100° F. rather than 70° C. Static shear is determined in accordance with PSTC–7 (Pressure-Sensitive Tape Council). The test is run at 150° F. with a 1000 gram load for 100 hours. Peel adhesion in pounds/inches is determined in accordance with PSTC–1. This test measures 180° peel adhesion and the test is conducted as peel of a Mylar strip from an aluminum panel and is reported as pounds per inch. The samples were prepared by casting a film of adhesive on 1 mil Mylar. The film was cast from solution with a drawbar to yield a 2 mil thick film when air dried for 20 minutes and oven cured for 10 minutes at 140° C. One inch wide tapes were die cut from the Mylar adhesive sheet and placed on metal panels in accordance with the method prescribed by the PSTC.

| | 1 | 2 | 3 | 4 | 5 | 6 | 7 | 8 | 9 |
|---|---|---|---|---|---|---|---|---|---|
| Polymer: | | | | | | | | | |
| Butyl acrylate | 95.3 | 64 | | | | | | | |
| 2-ethylhexyl acrylate | | | 66 | 79 | 64.5 | 62 | 71 | 61.5 | 94.3 |
| N-alkyl-keto-acrylamide [1] | | 30 | 30 | 10 | 30 | 35 | 25 | 35 | |
| N-methylol acrylamide | 2.2 | 1 | 1.8 | 1 | 0.5 | 1 | 1 | 0.5 | 2.5 |
| Acrylic acid | 1.5 | 5 | 1.2 | 10 | 5 | 2 | 3 | 3 | 1.5 |
| Acrylonitrile | | | 1 | | | | | | |
| Williams plasticity | 3.9 | 3.4 | 3.12 | 3.2 | 3.9 | 3.18 | 3.68 | 3.01 | 3.89 |
| Peel adhesion | 1.4 | 5 | 5 | 4.0 | 7 | 7.4 | 5.5 | 7.8 | 1.3 |

[1] [2-(2-methyl-4-oxopentyl)1]acrylamide.

$$CH_2{=}CH{-}COOCH_2CN$$

α-cyanoethyl acrylate having the structure

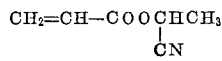

other vinyl and vinylidene monomers such as vinyl chloride, vinylidene chloride, styrene, the vinyl ethers, the vinyl esters, vinyl pyridine, ethylene, propylene, and the like.

For structural applications the copolymers preferably have a Williams plasticity value of greater than 2.75 and a peel adhesion value of greater than 3, preferably 5, pounds per linear inch. This balance of properties is required to obtain the desired degree of adhesion and cohesion for structural applications as in adhering plastic to metal.

These polymers are readily prepared by any of the polymerization techniques known to those skilled in the art. Solution, suspension, emulsion and dispersion techniques may be employed with solvents, diluents and water with free radical catalysts. For some adhesive applications, when the polymers are prepared in the presence of water, either by suspension or emulsion it is preferred that the polymer be separated from water and dried and applied as such or in solution. For this reason, an efficient method for preparing these polymers is by polymerization in a solvent. Such polymerizations are readily conducted by dissolving the monomers in a solvent such as acetone, methylethyl ketone, benzene, toluene and the like and adding a free radical catalyst, normally an organic peroxide, and heating to cause the monomers to copolymerize. For applications to backings where pressure-sensitive adhesives are useful the polymer is applied from solution.

A series of copolymers was prepared by dissolving 100 weight parts of monomers in 100 weight parts of methylethyl ketone, adding 0.3 part of benzoyl peroxide and heating at 60 to 80° C. until the polymerization was es- On static shear, these samples passed 100 hours at 150° F. with a 1000 gram load. This demonstrates the advantages of these adhesives at elevated temperatures. The combination of good cohesive strength at this temperature plus high peel strength is unique. Usually, good cohesive strength is obtained by curing the polymers and this results in decreased peel strength. These samples also pass the vinyl shrinkage test on glass (6 in. square of vinyl must shrink not more than 1/64 in. after 24 hours on glass at 158° F.). This rather severe test demonstrates the suitability of this adhesive for adhering polyvinyl chloride film to a wall surface.

Pressure-sensitive adhesives are normally used in the form of adhesive tapes comprising applying an adhesive coating to a backing material. The adhesive coating for a variety of applications must have permanent tack and adhesiveness, internal strength, cohesiveness and adhesive properties over a wide range of temperatures. A variety of backing materials may be used, for example; cotton cloth, vinyl film, rayon, and fiber glass cloths, silk, cellophane and cellulose acetate, paper, metal foils, and the like. The applications of such materials are well known.

The improved pressure-sensitive adhesives of this invention may be applied to suitable backings by roll coating, spraying, drawing, doctor blade or other known methods to a backing material. Particularly useful are backings such as cellophane, polychloroprene, terephthalate polyester, vinyl chloride polymers, paper, cloth, metal and the like. The adhesive is applied in sufficiently thick coat so that after the solvent flashes off the dry adhesive film is from about 0.5 to 5 mils thick. The resulting materials may be used in the form of rolls of pressure-sensitive adhesive tape, as backings for decorative items and in structural applications as will be obvious to those skilled in the art, for example, for bonding plastic decorative items to metal or vinyl upholstery. Metal coated ABS resins in the form of indicia or strips are readily adhered to steel by this adhesive.

I claim:
1. A solid pressure-sensitive adhesive composition comprising a random interpolymer of (1) more than about 50 weight percent of an alkyl acrylate wherein the alkyl group contains 4 to 8 carbon atoms, (2) from about 10 to 40 weight percent of an N-alkyl-keto-acrylamide having the structural formula

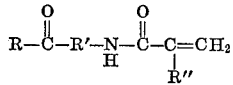

wherein R and R'' are hydrogen or an alkyl radical of 1 to 3 carbon atoms and R' is a lower alkyl-substituted ethylene radical containing 3 to 8 carbon atoms, (3) about 0.2 to about 3 weight percent of at least one of an N-alkylol amide of an $\alpha,\beta$-olefinically unsaturated carboxylic acid and an N-substituted alkoxy alkyl acrylamide or methacrmylamide wherein the N-alkylol amide contains 4 to 10 carbon atoms and the N-substituted alkoxyalkyl acrylamide or methacrylamide has the structural formula

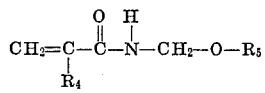

wherein $R_4$ is selected from the group consisting of hydrogen and methyl, and $R_5$ is an alkyl group having from 1 to 8 carbon atoms, and (4) at least one of an $\alpha,\beta$-olefinically unsaturated carboxylic acid in amounts of about 1 to 10 weight percent and a monoolefinically unsaturated amide having at least one hydrogen on the amide nitrogen and olefinic unsaturation $\alpha,\beta$- to the carbonyl group in amounts of about 0.5 to 5 weight percent, the weight percent of (1), (2), (3) and (4) being based on the interpolymer.

2. The composition of claim 1 wherein the (2) N-alkyl-keto-acrylamide R is an alkyl radical containing 1 to 3 carbon atoms and R'' is hydrogen or methyl and (4) the monoolefinically unsaturated amide has the structural formula

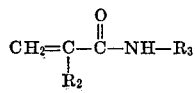

wherein $R_2$ is a member of the group consisting of hydrogen and an alkyl group having from 1 to 4 carbon atoms and $R_3$ is a member of the group consisting of hydrogen and an alkyl group having from 1 to 6 carbon atoms.

3. The composition of claim 2 wherein the (3) N-alkylol amide is N-methylol acrylamide or N-methylol methacrylamide, the N-alkoxyalkyl acrylamide is N-butoxymethyl acrylamide, the (4) carboxylic acid contains 3 to 6 carbon atoms and the other amide is acrylamide or methacrylamide.

4. The composition of claim 3 wherein the acrylic acid ester is 2-ethylhexyl acrylate, the N-alkyl-keto-acrylamide is N-(1,1-dimethyl-3-oxobutyl)-acrylamide, the carboxylic acid is acrylic or methacrylic acid and the amount of monomers (3) and (4) is at least about 0.5 weight percent each and the total is no greater than 10 weight percent.

5. The composition of claim 4 comprising (1) 2-ethylhexyl acrylate in amount from about 55 to 85 weight percent (3) N-methylol acrylamide in amounts from about 0.5 to 3 weight percent and (4) acrylic acid in amount from about 1 to 10 weight percent.

6. The composition of claim 5 wherein the N-alkyl-keto-acrylamide is present in amount from about 25 to 40 weight percent.

7. A pressure-sensitive article comprising a backing member and adherently bonded thereto a coating comprising a random interpolymer of (1) more than about 50 weight percent of an alkyl acrylate wherein the alkyl group contains 4 to 8 carbon atoms, (2) from about 10 to 40 weight percent of an N-alkyl-keto-acrylamide having the structural formula

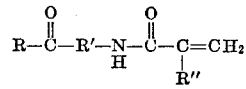

wherein R and R'' are hydrogen or an alkyl radical of 1 to 3 carbon atoms and R' is a lower alkyl-substituted ethylene radical containing 3 to 8 carbon atoms, (3) about 0.2 to about 3 weight percent of at least one of an N-alkylol amide of an $\alpha,\beta$-olefinically unsaturated carboxylic acid and an N-substituted alkoxyalkyl acrylamide or methacrylamide wherein the N-alkylol amide contains 4 to 10 carbon atoms and the N-substituted alkoxyalkyl acrylamide or methacrylamide has the structural formula

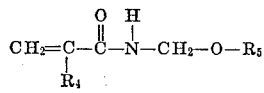

wherein $R_4$ is selected from the group consisting of hydrogen and methyl, and $R_5$ is an alkyl group having from 1 to 8 carbon atoms, and (4) at least one of an $\alpha,\beta$-olefinically unsaturated carboxylic acid in amounts of about 1 to 10 weight percent and a monoolefinically unsaturated amide having at least one hydrogen on the amide nitrogen and olefinic unsaturation $\alpha,\beta$- to the carbonyl group in amounts of about 0.5 to 5 weight percent, the weight percent of (1), (2), (3) and (4) being based on the interpolymer.

8. The article of claim 7 wherein the coating comprises an interpolymer of claim 2.

9. The araicle of claim 7 wherein the coating comprises an interpolymer of claim 3.

10. The article of claim 7 wherein the coating comprises an interpolymer of claim 4.

References Cited

UNITED STATES PATENTS

| 3,189,581 | 6/1965 | Hart et al. | 260—80.5 |
| 3,277,056 | 10/1966 | Coleman | 260—63 |
| 3,497,467 | 2/1970 | Coleman | 260—29.6 |

JOSEPH L. SCHOFER, Primary Examiner

S. M. LEVIN, Assistant Examiner

U.S. Cl. X.R.

117—122 P; 161—218; 260—78.5 R